United States Patent
Turchi et al.

(10) Patent No.: US 10,312,799 B1
(45) Date of Patent: Jun. 4, 2019

(54) OFFLINE CONVERTER WITH POWER FACTOR CORRECTION AT LIGHT LOADS AND METHOD THEREFOR

(71) Applicant: SEMICONDUCTOR COMPONENTS INDUSTRIES, LLC, Phoenix, AZ (US)

(72) Inventors: Joel Turchi, Gagnac sur Garonne (FR); Radim Mlcousek, Frenstat pod Radhostem (CZ); Lukas Olivik, Loukov (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/974,392

(22) Filed: May 8, 2018

(51) Int. Cl.
*H02M 1/42* (2007.01)
*H02M 1/38* (2007.01)
(Continued)

(52) U.S. Cl.
CPC ......... *H02M 1/4225* (2013.01); *H02M 1/38* (2013.01); *H02M 1/4208* (2013.01); *H02M 3/335* (2013.01); *H02M 2001/0009* (2013.01); *H02M 2001/0041* (2013.01); *H02M 2001/385* (2013.01); *Y02B 70/126* (2013.01)

(58) Field of Classification Search
CPC ...... H02M 1/38; H02M 1/081; H02M 1/4208; H02M 1/4225; H02M 7/155; H02M 7/48; H02M 3/3155; H02M 3/33507; H02M 3/523; H02M 2001/0032; G05F 1/32;
(Continued)

(56) References Cited

U.S. PATENT DOCUMENTS 5,124,597 A * 6/1992 Stuebing ................ H03K 5/133 327/261
5,867,379 A * 2/1999 Maksimovic ....... H02M 1/4225 323/222

(Continued)

OTHER PUBLICATIONS

CS1500, "Digital Power Factor Correction IC," Product Data Sheet, Cirrus Logic, Inc., Nov. 2010, 14 pages, DS849F1, Cirrus Logic, Inc., 800 West 6th Street, Austin, Texas 78701 United States.

(Continued)

*Primary Examiner* — Yemane Mehari
(74) *Attorney, Agent, or Firm* — Polansky & Associates, P.L.L.C.; Paul J. Polansky

(57) ABSTRACT

In one form, a power factor correction (PFC) controller, comprising includes a regulation circuit, a dead-time detection circuit, and a pulse width modulator. The regulation circuit provides a control voltage in response to a feedback voltage received at a feedback input terminal, wherein the feedback voltage is proportional to an output voltage. The dead-time detection circuit has an input coupled to a zero current detection input terminal, and an output for providing a dead-time signal. The pulse width modulator is responsive to the control voltage and the dead-time signal to provide a drive signal that controls conduction of a switch to improve a power factor of an offline converter, wherein the pulse width modulator modulates both an on-time and a switching period of the drive signal using the dead-time signal in a discontinuous conduction mode.

26 Claims, 11 Drawing Sheets

(51) Int. Cl.
*H02M 1/00* (2006.01)
*H02M 3/335* (2006.01)

(58) Field of Classification Search
CPC ......... G05F 1/33; G05F 1/455; Y02B 70/126; H02J 3/382; H02J 7/12
USPC ............................. 363/84, 86, 89, 90, 95, 97
See application file for complete search history.

(56) References Cited

U.S. PATENT DOCUMENTS

| | | | | |
|---|---|---|---|---|
| 7,271,632 | B2* | 9/2007 | Cottin | H03K 4/502 327/131 |
| 9,048,752 | B2* | 6/2015 | Capilla | H02M 1/4225 |
| 10,008,924 | B1* | 6/2018 | Turchi | H02M 1/4208 |

OTHER PUBLICATIONS

CS1600, "Low-cost PFC Controller for Electronic Ballasts," Product Data Sheet, Cirrus Logic, Inc., May 2010, 18 pages, DS904A5, Cirrus Logic, Inc., 800 West 6th Street, Austin, Texas 78701 United States.
MC33368, "High Voltage GreenLine Power Factor Controller," Product Data Sheet, Semiconductor Components Industries, LLC, Aug. 2011, 16 pages, MC33368/D-Rev. 11, Semiconductor Components Industries, LLC, P.O. Box 5163, Denver, Colorado 80217 United States.
NCP1602, "Enhanced, High-Efficiency Power Factor Controller," Product Data Sheet, Semiconductor Components Industries, LLC, Oct. 2015, 32 pages, NCP1602/D-Rev. 0, Semiconductor Components Industries, LLC, P.O. Box 5163, Denver, Colorado 80217 United States.
NCP1605, "Enhanced, High Voltage and Efficient Standby Mode, Power Factor Controller," Product Data Sheet, Semiconductor Components Industries, LLC, Oct. 2014, 32 pages, NCP1605/D-Rev. 12, Semiconductor Components Industries, LLC, P.O. Box 5163, Denver, Colorado 80217 United States.
NCP1611, "Enhanced, High-Efficiency Power Factor Controller," Product Data Sheet, Semiconductor Components Industries, LLC, Jan. 2015, 29 pages, NCP1611/D-Rev. 4, Semiconductor Components Industries, LLC, P.O. Box 5163, Denver, Colorado 80217 United States.
NCP1631, "Interleaved, 2-Phase Power Factor Controller," Product Data Sheet, Semiconductor Components Industries, LLC, Jan. 2015, 24 pages, NCP1631/D-Rev. 6, Semiconductor Components Industries, LLC, P.O. Box 5163, Denver, Colorado 80217 United States.
IDP2303, "Digital Multi-Mode PFC + LLC Combo Controller," Product Data Sheet, Infineon Technoligies AG, Mar. 2017, 38 pages, IDP2303 Rev. V2.0, Infineon Technologies AG, Am Campeon 1-12, 81726 Munich, Germany.
UCC28056, "6-Pin Single-Phase Transition-Mode PFC Controller," Product Data Sheet, Texas Instruments, SLUSD37C—Oct. 2017, Revised Feb. 2018, 52 pages, Texas Instruments, P.O. Box 655303, Dallas Texas 75265 United States.
AND8324/D, "300 W, Wide Mains, PFC Stage Driven by the NCP1654," Product Data Sheet, Semiconductor Components Industries, LLC, Oct. 2009, AND8324/D-Rev. 2, 12 pages, Texas Instruments, Semiconductor Components Industries, LLC, P.O. Box 5163, Denver, Colorado 80217 United States.

* cited by examiner

OFFLINE CONVERTER WITH POWER FACTOR CORRECTION AT LIGHT LOADS AND METHOD THEREFOR

FIELD OF THE DISCLOSURE

The present disclosure relates generally to power conversion circuits, and more particularly to offline converters with power factor correction.

BACKGROUND

An off-line power converter can be implemented using an integrated circuit power factor correction (PFC) controller. The PFC controller helps to boost the efficiency of power transfer to the load by making the current and voltage waveforms in phase with each other. To reduce electromagnetic interference (EMI), a typical offline converter with a PFC controller operates in critical conduction mode (CrM) in which a new switching cycle begins when the current through an inductor of the PFC stage drops to zero. The instantaneous inductor current varies from zero to a value that is proportional to the line voltage, and the average inductor current follows the same wave-shape as the input voltage, thus providing no distortion or phase shift in the current waveform.

In PFC controllers, it is difficult to preserve efficiency and to simultaneously achieve near-unity power factor across the entire load range. One solution to this problem is known as frequency-clamped CrM. As the level of the load lightens, a CrM controller with frequency clamped CrM clamps the natural switching frequency to preserve high efficiency. Once the frequency is clamped, the PFC controller enters discontinuous conduction mode (DCM). The power factor drops as the frequency varies from the natural frequency due to the frequency clamping if no circuitry to compensate for the dead-times is implemented. With frequency-clamped CrM controllers that incorporate circuitry to compensate for the dead-times, the power factor remains high but some noise can be generated due hesitations between valleys, and some current bumps can be observed particularly at transitions between CrM and DCM operation.

Other PFC controllers use techniques such as valley-synchronized frequency foldback (VSFF) and current controlled frequency foldback (CCFF) that reduce the switching frequency at light loads by forcing some dead-time without providing a firm frequency clamp. These PFC controllers modulate on-time to compensate for dead times experienced in DCM. They achieve high power factor at light loads but do not firmly control the frequency range. They may also experience current bumps when switching between valleys or transitioning between CrM and DCM.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
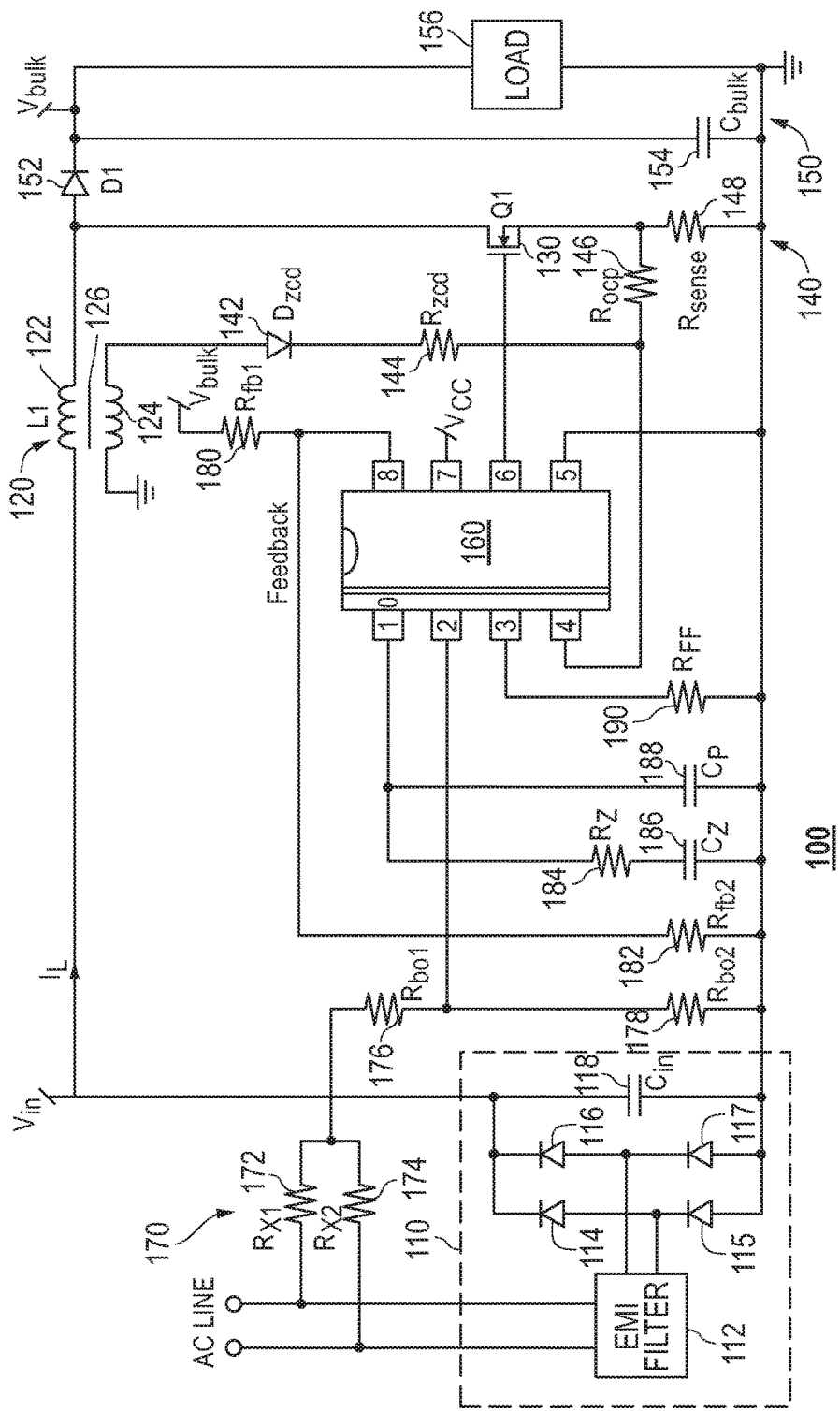
FIG. 1 illustrates in partial block diagram and partial schematic form an off-line power converter including an integrated circuit power factor correction (PFC) controller.

FIG. 1 illustrates in partial block diagram and partial schematic form an off-line power converter 100 including an 8-pin integrated circuit power factor correction (PFC) controller 160. Off-line power converter 100 generally includes a rectifier 110, a transformer 120, a drive transistor 130 labeled "Q1", a sensing circuit 140, an output circuit 150, integrated circuit power factor controller 160, a line sensing circuit 170, a resistor 180 labeled "$R_{fb1}$", a resistor 182 labeled "$R_{fb2}$", a resistor 184 labeled "Rz", a capacitor 186 labeled "Cz", a capacitor 188 labeled "$C_P$", and a resistor 190 labeled "$R_{FF}$".

Rectifier 110 includes an electromagnetic interference ("EMI") filter 112, a diode 114, a diode 115, a diode 116, a diode 117, and a capacitor 118 labeled "$C_{in}$". Rectifier 110 has an input terminal connected to a first "AC line" power supply terminal, an input terminal connected to a second AC line power supply terminal, an output terminal to provide a first power supply terminal, and an output terminal connected to ground, which serves as a reference voltage terminal for off-line power converter 100. Diode 114 has an anode connected to the first power supply terminal provided by EMI filter 112, and a cathode to provide a voltage labeled "$V_{in}$". Diode 115 has an anode connected to ground, and a cathode connected to the anode of diode 114. Diode 116 has an anode connected to the second power supply terminal provided by EMI filter 112, and a cathode connected to the cathode of diode 114. Diode 117 has an anode connected to ground, and a cathode connected to the anode of diode 116. Capacitor 118 has a first terminal connected to the cathode of diode 116, and a second terminal connected to ground. In an alternate configuration, the negative terminal of diode bridge 110 (the anodes of diodes 115 and 117) can be connected to another node, for example to perform negative current sensing. In this case, a resistor is inserted in the current return path between the anodes of diodes 115 and 117 and the second terminal of capacitor 118 and ground. In this case, the common connection point of the anodes of diodes 115 and 117 is below zero when a current is flowing across the resistor. If ground is at zero volts, then the voltage at the negative terminal of diode bridge 110 is equal to negative the resistance of the resistor times the current through the primary winding of transformer 120.

Transformer 120 includes a primary winding 122 labeled "L1", a secondary winding 124, and a transformer core 126. Primary winding 122 has a first terminal to receive $V_{in}$, and a second terminal. Secondary winding 124 has a first terminal connected to ground, and a second terminal.

Drive transistor 130 has a gate electrode, a drain electrode connected to the second terminal of primary winding 122, a source electrode, and a substrate electrode connected to the source electrode.

Sensing circuit 140 includes a diode 142 labeled "$D_{zcd}$", a resistor 144 labeled "$R_{zcd}$", a resistor 146 labeled "$R_{ocp}$", and a resistor 148 labeled "$R_{sense}$". Diode 142 has an anode connected to the second terminal of secondary winding 124, and a cathode. Resistor 144 has a first terminal connected to the cathode of diode 142, and a second terminal. Resistor 146 has a first terminal connected to the second terminal of resistor 144, and a second terminal connected to the source electrode of drive transistor 130. Resistor 148 has a first terminal connected to the second terminal of resistor 146, and a second terminal connected to ground.

Output circuit 150 includes a diode 152 labeled "Dl", a bulk capacitor 154 labeled "$C_{bulk}$", and a load 156. Diode 152 has an anode connected to the drain electrode of drive transistor 130, and a cathode to provide a voltage labeled "$V_{bulk}$". Bulk capacitor 154 has a first terminal connected to the cathode of diode 152, and a second terminal connected to ground. Load 156 has a first terminal connected to the first terminal of bulk capacitor 154, and a second terminal connected to ground.

Integrated circuit power factor controller 160 has a first terminal, a second terminal, a third terminal, a fourth terminal connected to the first terminal of resistor 146, a fifth terminal connected to ground, a sixth terminal connected to the gate electrode of drive transistor 130, a seventh terminal to receive a power supply voltage labeled "$V_{CC}$", and an eighth terminal to receive a signal labeled "Feedback".

Line sensing circuit 170 includes a resistor 172 labeled "$R_{X1}$", a resistor 174 labeled "$R_{X2}$.", a resistor 176 labeled "$R_{bo1}$", and a resistor 178 labeled "$R_{bo2}$". Resistor 172 has a first terminal connected to the first AC line power supply terminal, and a second terminal. Resistor 174 has a first terminal connected to the second AC line power supply terminal, and a second terminal connected to the second terminal of resistor 172. Resistor 176 has a first terminal connected to the second terminal of resistor 174, and a second terminal connected to the second terminal of integrated circuit power factor controller 160. Resistor 178 has a first terminal connected to the second terminal of resistor 176, and a second terminal connected to ground.

Resistor 180 has a first terminal to receive $V_{bulk}$, and a second terminal to provide the Feedback signal. Resistor 182 has a first terminal connected to the eighth terminal of integrated circuit power factor controller 160, and a second terminal connected to ground. Resistor 184 has a first terminal connected to the first terminal of integrated circuit power factor controller 160, and a second terminal. Capacitor 186 has a first terminal connected to the second terminal of resistor 184, and a second terminal connected to ground. Capacitor 188 has a first terminal connected to the first terminal of resistor 184, and a second terminal connected to ground. Resistor 190 has a first terminal connected to the third terminal of integrated circuit power factor controller 160, and a second terminal connected to ground.

In operation, rectifier 110 provides a full-wave rectified voltage Vin with filtering between the power supply mains (AC line), and downstream circuitry of off-line power converter 100. In particular, rectifier 110 manages the propagation of unwanted energy from the AC line to downstream circuits by passing the signals through EMI filter 112. EMI filter 112 filters EMI interference so that downstream circuits are not disturbed during operation. EMI filter 112 receives the AC line signal and provides a filtered AC signal to its output terminals. Diodes 114, 115, 116 and 117 provide a rectified input voltage $V_{in}$, stored and filtered across capacitor 118, to the downstream circuits of off-line power converter 100.

For transformer 120, a varying alternating current through primary winding 122 creates a varying magnetic flux in transformer core 126 of transformer 120 that results in a varying alternating voltage across primary winding 122. By inductive coupling, the varying magnetic flux creates a varying magnetic field in the coils of secondary winding 124. As is known, the voltage induced in secondary winding 124 is a mathematical function of the voltage across primary winding 122 and is defined by the ratio of the number of turns in secondary winding 124 to the number of turns in primary winding 122.

During an on time ("$T_{ON}$"), integrated circuit power factor controller 160 pulls up terminal 6 to provide a positive drive voltage on the gate electrode of drive transistor 130, which is an N-channel metal oxide semiconductor field effect transistor ("MOSFET"). Drive transistor 130 transitions to the "on state" and provides a low impedance current path to ground at the second terminal of primary winding 122. Rectifier 110 provides $I_L$, and $I_L$ flows through primary winding 122, drive transistor 130, and resistor 148. Drive transistor 130 operates to lower the drain electrode voltage towards ground, and transformer 120 builds its magnetic field and stores energy as a function of $I_L$.

Resistor 148 senses the current flowing through drive transistor 130 and provides a voltage level to terminal 4 of integrated circuit power factor controller 160. Resistor 148 provides a positive voltage to terminal 4 as a function of the current flowing from the drain electrode to the source electrode of drive transistor 130. If the voltage on terminal 4 exceeds a threshold, integrated circuit power factor controller 160 determines that drive transistor 130 is operating in an over current condition, and deactivates drive transistor 130.

During an off ("$T_{OFF}$") time, integrated circuit power factor controller 160 pulls down terminal 6 to make drive transistor 130 nonconductive. Drive transistor 130 transitions to the "off state" and provides a high impedance current path at the second terminal of primary winding 122. In response, primary winding 122 resists the changing $I_L$, and operates to raise the voltage at the second terminal of primary winding 122. Diode 152 turns on as a function of the voltage provided by primary winding 122 to provide $I_L$ to output circuit 150 and to increase $V_{bulk}$. Bulk capacitor 154 stores $V_{bulk}$ across load 156 as a function of $I_L$, and filters high frequency voltage transitions across load 156.

Also, secondary winding 124 operates to raise the voltage on the anode of diode 142 of sensing circuit 140. Diode 142 turns on and enables current flow through resistors 144, 146, and 148 in response to the voltage induced in secondary winding 124. Sensing circuit 140 provides a voltage to terminal 4 of integrated circuit power factor controller 160 to indicate when the magnetic field of secondary winding 124 is in a "demagnetization" phase by detecting when secondary winding 124 is providing zero current, known as zero current detection ("ZCD"). As a function of the voltage on terminal 4, if integrated circuit power factor controller 160 detects ZCD, integrated circuit power factor controller 160 adjusts the operation of certain internal circuits. Secondary winding 124 and diode 142 operate to prevent interference between OCP detection, when drive transistor 130 is in the on state, and ZCD detection, when drive transistor 130 is in the off state.

Line sensing circuit 170 senses the instantaneous voltage of the AC line by dividing the AC line voltage as a function of the values of resistors 172, 174, 176, and 178. The second terminal of resistor 176 forms a voltage at terminal 2 of integrated circuit power factor controller 160. If the voltage on terminal 2 is less than a threshold for a certain duration, such as a time longer than a half-line cycle, integrated circuit power factor controller 160 detects a brown-out condition and stops operation to prevent excessive stress.

Off-line power converter 100 provides $V_{bulk}$ to the first terminal of resistor 180 to provide the Feedback signal as a function of the values of resistors 180 and 182. The second terminal of resistor 180 forms a voltage at terminal 8 of integrated circuit power factor controller 160. As a function of the voltage on terminal 8, integrated circuit power factor controller 160 regulates the duty cycle of drive transistor 130 and disables it immediately if the output voltage is too high.

Integrated circuit power factor controller 160 provides a signal from the output of an internal error amplifier implemented as an operational transconductance amplifier used in the voltage regulation loop to terminal 1. A circuit network formed by resistor 184, capacitor 186, and capacitor 188 and connected to terminal 1 adjusts the regulation loop bandwidth and phase margin.

Integrated circuit power factor controller 160 provides an output voltage at terminal 3 to resistor 190 to form a voltage as a function of the current provided by the AC line. As a function of the voltage on terminal 3, integrated circuit power factor controller 160 adjusts the dead time and initiates cycle skipping. It is desirable for controller 160 to implement a control technique that maintains both high power factor and high efficiency across the entire load range, including light and very light loads.

Figure 2:
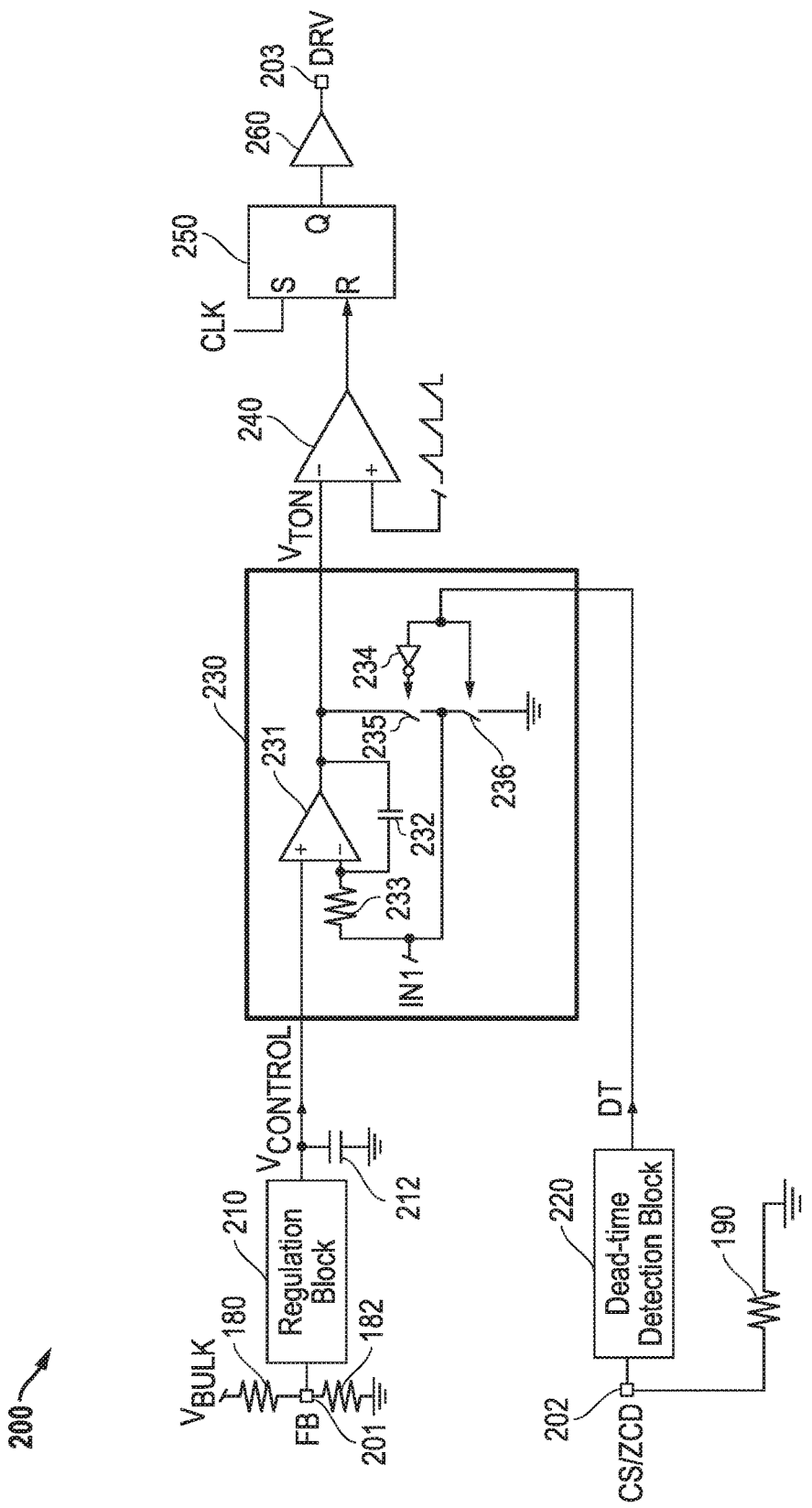
FIG. 2 illustrates in partial block diagram and partial schematic form a PFC controller known in the prior art that can be used in the off-line power converter of FIG. 1.

FIG. 2 illustrates in partial block diagram and partial schematic form a power factor correction (PFC) controller 200 known in the prior art that can be used in off-line power converter 100 of FIG. 1. PFC controller 200 has a set of integrated circuit terminals including a feedback terminal 201 labeled "FB", a current sense/zero current detection terminal 202 labeled "CS/ZCD", and a drive terminal 203 labeled "DRV". Connected to FB terminal 201 are resistors 180 and 182 as previously illustrated in FIG. 1.

PFC controller 200 includes generally a regulation block 210, a capacitor 212, a dead-time detection block 220, an on-time processing block 230, a comparator 240, a latch 250, and a driver 260. Regulation block 210 has an input connected to feedback terminal 201, and an output for providing a regulated control voltage labeled "$V_{CONTROL}$". Capacitor 212 has a first terminal connected to the output of regulation block 210, and a second terminal connected to ground. Dead-time detection block 220 has an input connected to current sense terminal 202, and an output for providing a dead-time detect signal labeled "DT".

On-time processing block 230 has an input connected to the output of regulation block 210, an input connected to the output of dead-time detection block 220, and an output for providing an on-time voltage signal labeled "$V_{TON}$". On-time processing block 230 includes an amplifier 231, a capacitor 232, a resistor 233, an inverter 234, a switch 235, and a switch 236. Amplifier 231 has a non-inverting input connected to the output of regulation block 210, an inverting input, and an output. Capacitor 232 has a first terminal connected to the output of amplifier 231, and a second terminal connected to the inverting input of amplifier 231. Resistor 233 has a first terminal, and a second terminal connected to the inverting input of amplifier 231. Inverter 234 has an input connected to the output of dead-time detection block 220, and an output. Switch 235 has a first terminal connected to the output of amplifier 231, a second terminal connected to the first terminal of resistor 233, and a control terminal connected to the output of inverter 234. Switch 236 has a first terminal connected to the second terminal of switch 235 and to the first terminal of resistor 233, a second terminal connected to ground, and a control terminal connected to the output of dead-time detection block 220.

Comparator 240 has a negative input connected to the output of amplifier 231, a positive input terminal for receiving a ramp signal, and an output. Latch 250 is an SR latch having a set input labeled "S" for receiving a clock signal labeled "CLK", a reset input labeled "R" connected to the output of comparator 240, and an output labeled "Q". Driver 260 has an input connected to the output of latch 250, and an output connected to terminal 203.

In operation, PFC controller 200 provides the DRV output signal in response to its control algorithm. Regulation block 210 receives the feedback signal and provides $V_{CONTROL}$ in response to comparing the FB signal to a reference voltage and filtering the feedback signal for loop stability. Capacitor 212 can be an external capacitor connected to an integrated circuit terminal and while FIG. 2 shows it as a single capacitor for simplicity this capacitor is commonly formed as a capacitor in parallel with a series combination of a capacitor and a resistor. Moreover regulation block 210 can include circuitry to clamp $V_{CONTROL}$ to a particular value.

On-time processing block 230 modulates $V_{CONTROL}$ based on the measured dead-time. Amplifier 231 and capacitor 232 form an integrator, and modulate $V_{CONTROL}$ based on the ratio of the switching cycle period (on-time plus demagnetization time) over the total switching period including the dead-time, i.e. the duty cycle. When DT is inactive at a logic low, switch 235 is closed and switch 236 is open. For the period of time that DT is low, the first terminal of resistor 233 receives $V_{TON}$. For the period of time that DT is active at a logic high, the first terminal of resistor 233 is connected to ground at zero volts. Thus the first terminal of resistor 233 receives on average a voltage equal to $V_{TON}$*duty cycle. Comparator 240 compares the level of $V_{TON}$ to a fixed ramp voltage and the on-time of the DRV signal ends when the ramp signal exceeds $V_{TON}$.

Figure 3:
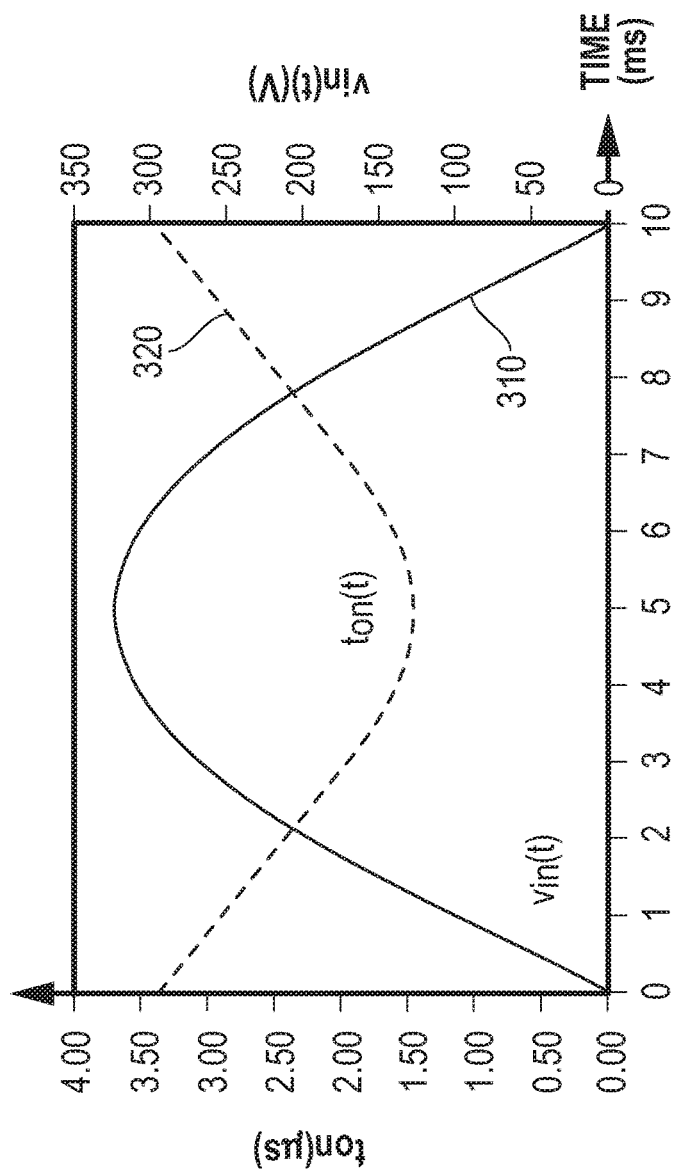
FIG. 3 illustrates a timing diagram of the input voltage and on-time of the PFC controller of FIG. 2.

FIG. 3 illustrates a timing diagram 300 of the input voltage and on-time of PFC controller 200 of FIG. 2. In timing diagram 300, the horizontal axis represents time in milliseconds (msec), the left vertical axis represents on-time in microseconds (µs), and the right vertical axis represents input voltage in volts. Timing diagram 300 shows two waveforms of interest, including a first waveform 310 showing input voltage $V_{IN}(t)$, and a second waveform 320 showing on time $t_{ON}(t)$. As can be seen over a half line cycle of 10 ms in a system in which $v_{IN}(t)$ is a 50 hertz (Hz), 230 V RMS voltage, $v_{IN}(t)$ varies from 0.0 V at 0 ms to a peak of around 320 V at around 5 ms, back to 0 V at 10 ms. At the same time, $t_{ON}(t)$ goes from about 3.40 μs at 0 ms down to about 1.50 μs at about 5 ms and up to about 3.40 μs at 10 ms. Thus on-time varies as the input power and AC line voltage vary within the haversine half cycle. This kind of $t_{ON}$ variation can result from clamping the switching frequency to a fixed value. In this case, the frequency clamp causes dead-times which are higher near the line zero crossing, thus causing higher $t_{ON}$ but substantially constant frequency.

In this way, PFC controller 200 modulates the on-time to compensate for the dead-time and tends to reduce the dead-time. This control technique achieves close to unity power factor in discontinuous conduction mode (DCM) and maintains light load efficiency, but also can significantly vary dead-time from one cycle to another when the valley at which the MOSFET turns on needs to be changed and suffers from a large variation in the averaged current and current bumps or "glitches".

Figure 4:
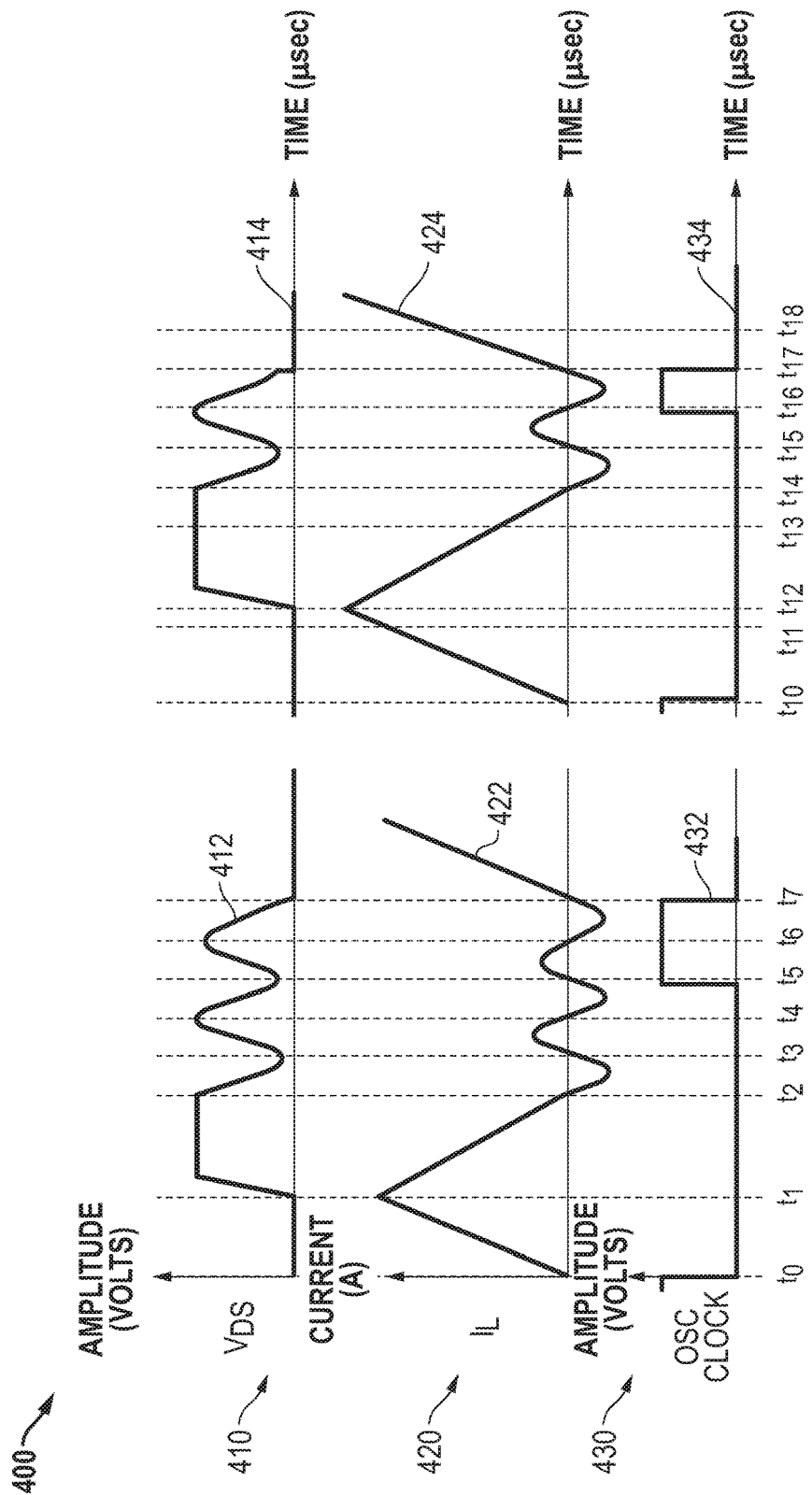
FIG. 4 illustrates a timing diagram showing three waveforms related to the switching of a PFC controller known in the prior art that can be used in the off-line power converter of FIG. 1.

FIG. 4 illustrates a timing diagram 400 showing three waveforms related to the switching of a PFC controller known in the prior art that can be used in off-line power converter 100 of FIG. 1. In FIG. 4, the horizontal axis represents time in μs. Three waveforms are shown on the same time axis but with different vertical axes, including a waveform 410 showing the drain-to-source voltage ($V_{DS}$) of transistor 130 in which the vertical axis represents amplitude in volts (V), a waveform 420 of the current through the primary winding of transformer 120 labeled "$I_L$" in which the vertical axis represents current in amperes (A), and a waveform 430 showing an oscillator clock signal labeled "OSC CLOCK" in which the vertical axis represents amplitude in V.

Timing diagram 400 shows the operation of a PFC controller that uses a control technique known as valley synchronized frequency foldback (VSFF). Timing diagram 400 shows two switching cycles. The first switching cycle corresponds to a $V_{DS}$ waveform segment 412, an $I_L$ waveform segment 422, and an OSC CLOCK waveform segment 432. As shown in timing diagram 400, at about time $t_0$, the OSC CLOCK waveform segment transitions to a logic low. The transition sets latch 250, which activates the DRV signal. Transistor 130 becomes conductive, and its $V_{DS}$ decreases to about 0 V. The de-activation of the OSC CLOCK signal initiates a cycle of the ramp signal (not shown in FIG. 4) and load current $I_L$ rises from $t_0$ to $t_1$. At time $t_1$, the ramp signal intersects $V_{TON}$, which resets latch 250 and causes driver 260 to deactivate the DRV signal. Thus $V_{DS}$ rises after $t_1$ until boost diode 152 turns on. Load current $I_L$ falls from $t_1$ to $t_2$, transformer 120 becomes fully demagnetized at time $t_2$, and the dead-time of this switching cycle begins. $V_{DS}$ and $I_L$ start ringing, with a valley in the $V_{DS}$ waveform occurring at times $t_3$, $t_5$, and $t_7$. According to the level of $V_{FB}$, PFC controller 200 detects the third valley and de-activates the OSC CLOCK signal at time $t_7$, starting another switching cycle.

The second switching cycle corresponds to a $V_{DS}$ waveform segment 414, an $I_L$ waveform segment 424, and an OSC CLOCK waveform segment 434. In the second switching cycle, the load is larger. As shown in timing diagram 400, the OSC CLOCK waveform segment transitions to a logic low at about time $t_{10}$. The transition sets latch 250, which activates the DRV signal. Transistor 130 becomes conductive, and its $V_{DS}$ decreases to about 0 V. The de-activation of the OSC CLOCK signal initiates a cycle of the ramp signal that rises in voltage from times $t_{10}$ to $t_{12}$, passing time $t_{11}$ that corresponds to the level of $V_{TON}$ during the first switching cycle. At time $t_{12}$, the ramp signal intersects the increased value of $V_{TON}$, which resets latch 250 and causes driver 260 to deactivate the DRV signal. $V_{DS}$ rises after $t_{12}$ until boost diode 152 turns on. When transformer 120 becomes fully demagnetized at time $t_{14}$, $I_L=0$ A and the dead-time of this switching cycle begins. Note that the time from $t_{12}$ to $t_{13}$ corresponds to the length of the demagnetization time in the first switching cycle. $V_{DS}$ and $I_L$ start ringing, with a valley in the $V_{DS}$ waveform occurring at times $t_{15}$ and $t_{17}$. According to the level of $V_{FB}$, PFC controller 200 detects the second valley instead of the third valley because the load has gotten heavier. It de-activates the OSC CLOCK signal at time $t_{17}$, starting another switching cycle.

Between the first and second switching cycles, the cycle time (on-time plus demagnetization time) increases, while the switching period decreases somewhat and the dead-time decreases significantly. The OSC CLOCK is generated a fixed amount of time after the DRV pulse goes high. A small increase in the on-time causes the second valley to be the first valley detectable while the OSC CLOCK signal is high during the second switching cycle, while the third valley was the first valley detectable when the OSC CLOCK signal is high during the first switching cycle. Thus, the on-time is longer leading a higher peak and in addition, due to the synchronization to a valley, the dead-time is reduced. These two effects cause a large variation in averaged current, which will now be described.

Figure 5:
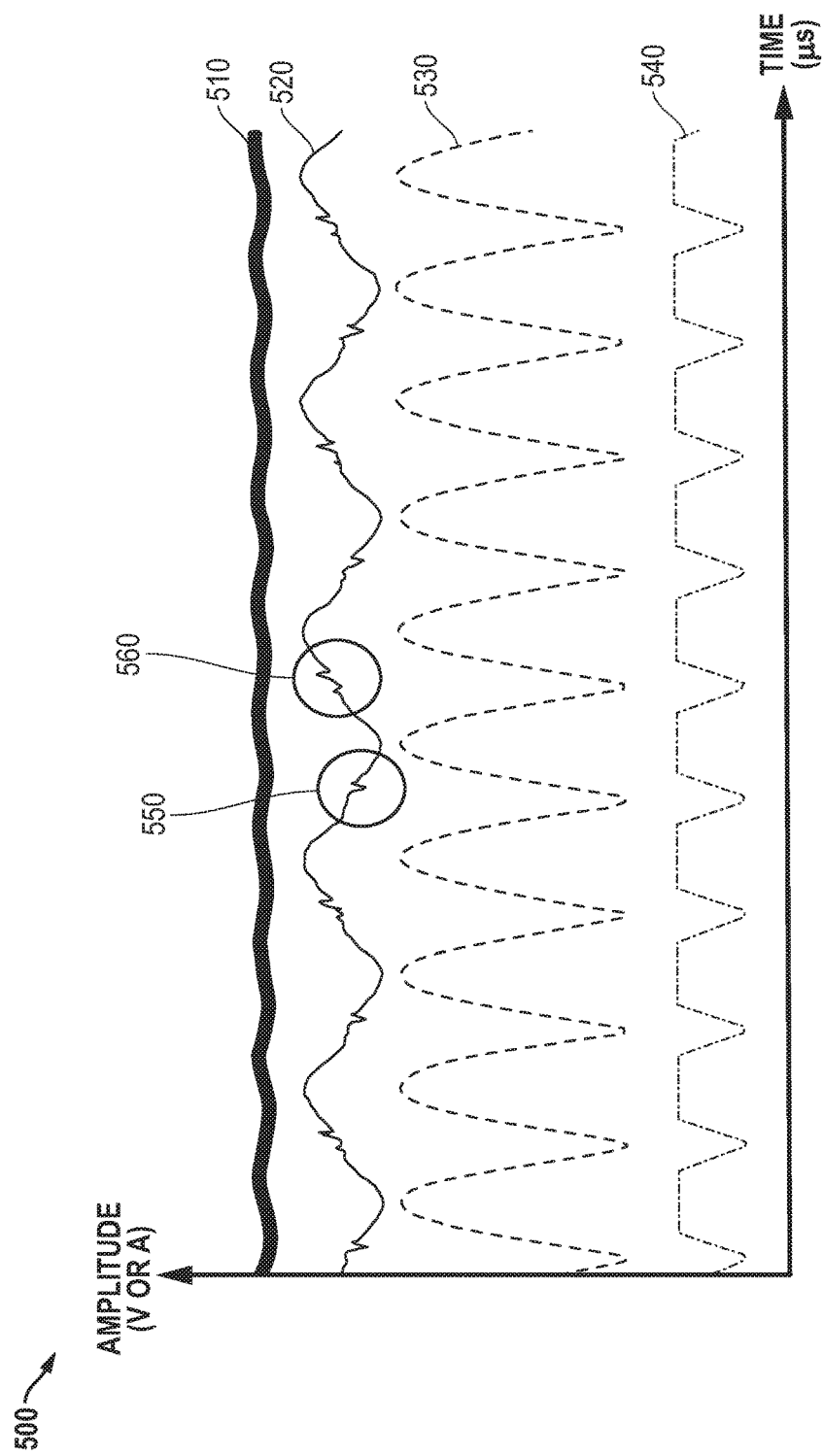
FIG. 5 illustrates a timing diagram showing four signal waveforms caused by switching of the PFC controller of FIG. 2.

FIG. 5 illustrates a timing diagram 500 showing four signal waveforms caused by switching of PFC controller 200 of FIG. 2. In timing diagram 500, the horizontal axis represents time in μs and the vertical axis represents voltage or current as the case may be. Timing diagram 500 shows four signals of interest, including a waveform 510 showing voltage $V_{BULK}$, a waveform 520 showing line current in A, a waveform 530 showing input voltage $V_{IN}$, and a waveform 540 showing frequency foldback control pin voltage that appears on the third terminal of integrated circuit power factor controller 160 in FIG. 1.

$V_{IN}$ is a full-wave rectified sinusoidal line voltage, i.e. a haversine. The minima of the haversine correspond to minima of the $FF_{CONTROL}$ voltage and zero crossings of the input line voltage. Thus when the $FF_{CONTROL}$ signal goes low, it corresponds to a low line voltage. Waveform 520 shows that as the $FF_{CONTROL}$ pin voltage rises as $V_{IN}$ rises in each half cycle, PFC controller 200 enters CrM and these transitions cause undesirable current glitches 550 and 560 and similar glitches to occur.

Figure 6:
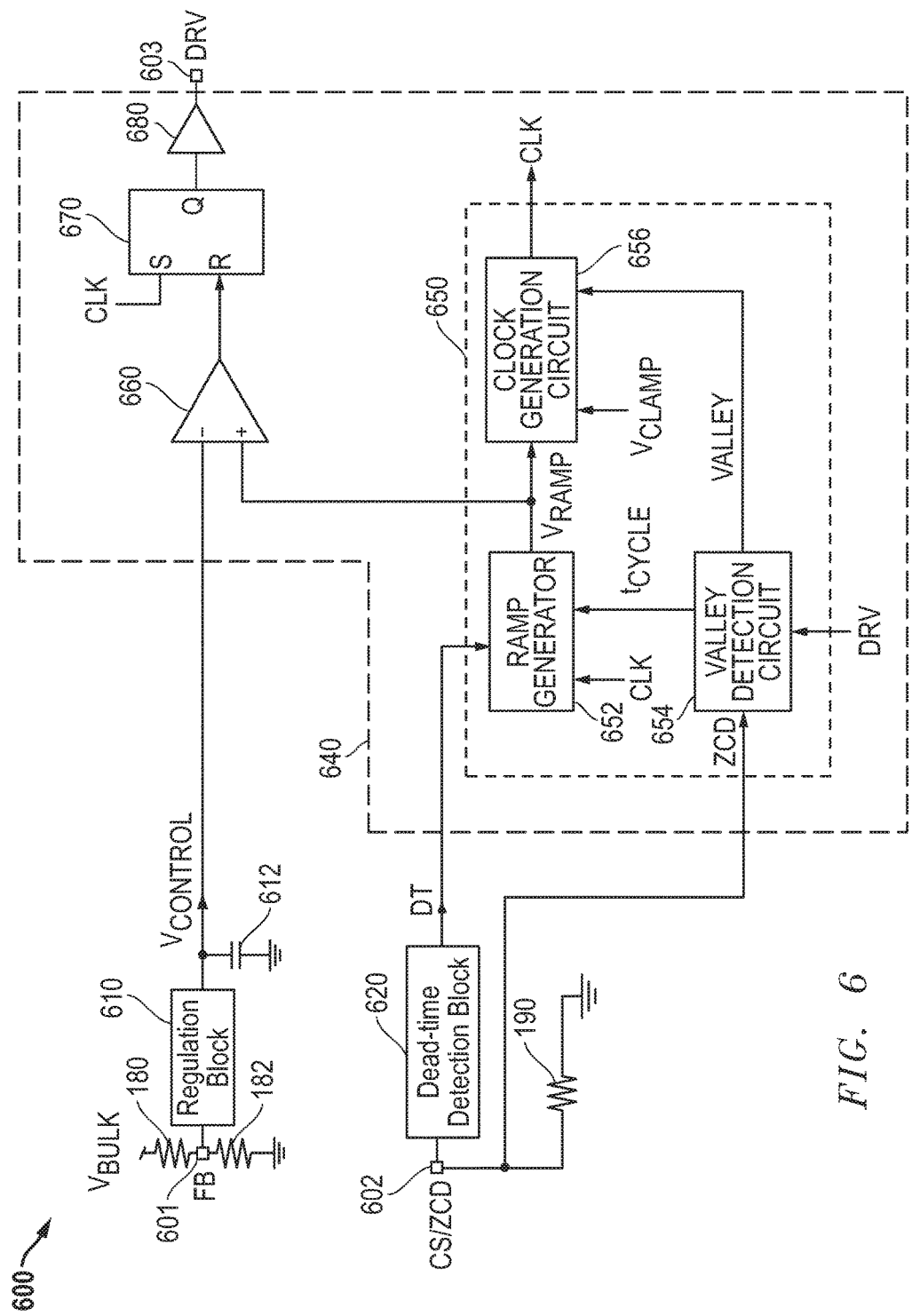
FIG. 6 illustrates in partial block diagram and partial schematic form a PFC that can be used in the off-line power converter of FIG. 1 according to various embodiments.

FIG. 6 illustrates in partial block diagram and partial schematic form a PFC controller 600 that can be used in off-line power converter 100 of FIG. 1 according to various embodiments. PFC controller 600 has a set of integrated circuit terminals including a feedback terminal 601 (FB), a current sense/zero current detection terminal 602 (CS/ZCD), and a drive terminal 603 (DRV). Connected to FB terminal are resistors 180 and 182 as previously illustrated in FIG. 1.

PFC controller 600 includes generally a regulation block 610, a capacitor 612, a dead-time detection block 620, and a pulse width modulation (PWM) circuit 640. Regulation block 610 has an input connected to feedback terminal 201, and an output for providing regulated voltage $V_{CONTROL}$. Capacitor 612 has a first terminal connected to the output of regulation block 610, and a second terminal connected to ground. Dead-time detection block 620 has an input connected to current sense terminal 602, and an output for providing dead-time detect signal DT.

Pulse width modulation (PWM) circuit 640 includes a ramp control circuit 650, a comparator 660, a latch 670, and a driver 680. Ramp control circuit 650 includes a ramp generator 652, a valley detection circuit 654, and a clock generator 656. Ramp generator 652 has a first input connected to the output of dead-time detection block for receiving the DT signal, an input for receiving a clock signal labeled "CLK", a second input for receiving an end-of-cycle signal labeled "$t_{CYCLE}$", and an output for providing a ramp signal labeled "$V_{RAMP}$". Valley detection circuit 654 has a first input connected to pin 602 for receiving a zero current detect signal labeled "ZCD", a second input for receiving drive signal DRV, a first output connected to the second input of ramp generator 652 for providing the $t_{CYCLE}$ signal, and a second output for providing a detected valley signal labeled "VALLEY". Clock generator 656 has a first input for receiving the $V_{RAMP}$ signal, a second input for receiving the VALLEY signal, and an output for providing the CLK signal.

Comparator 640 has a negative input for receiving the $V_{CONTROL}$ signal, a positive input connected to the output of ramp generator 652 for receiving the $V_{RAMP}$ signal, and an output. Latch 670 is an SR latch having a set input (S) for receiving the CLK signal, a reset input (R) connected to the output of comparator 660, and an output (Q). Driver 680 has an input connected to the output of latch 670, and an output connected to terminal 603.

In operation, PFC controller 600 operates similarly to PFC controller 200 of FIG. 2, except that it uses a different control technique. As the load lightens, the switching frequency rises. Like frequency-clamped controllers, PFC controller 600 prevents the switching frequency from exceeding the preset level. It modulates both the on-time and the switching period of the DRV signal using the DT signal in a discontinuous conduction mode without substantially changing the dead-time. In this way, unlike PFC controller 200 of FIG. 2, PFC controller 600 provides a firm frequency clamp and avoids the possible noise and current glitches of PFC controllers operating in DCM, while maintaining near-unity power factor and high efficiency across widely varying load conditions.

Figure 7:
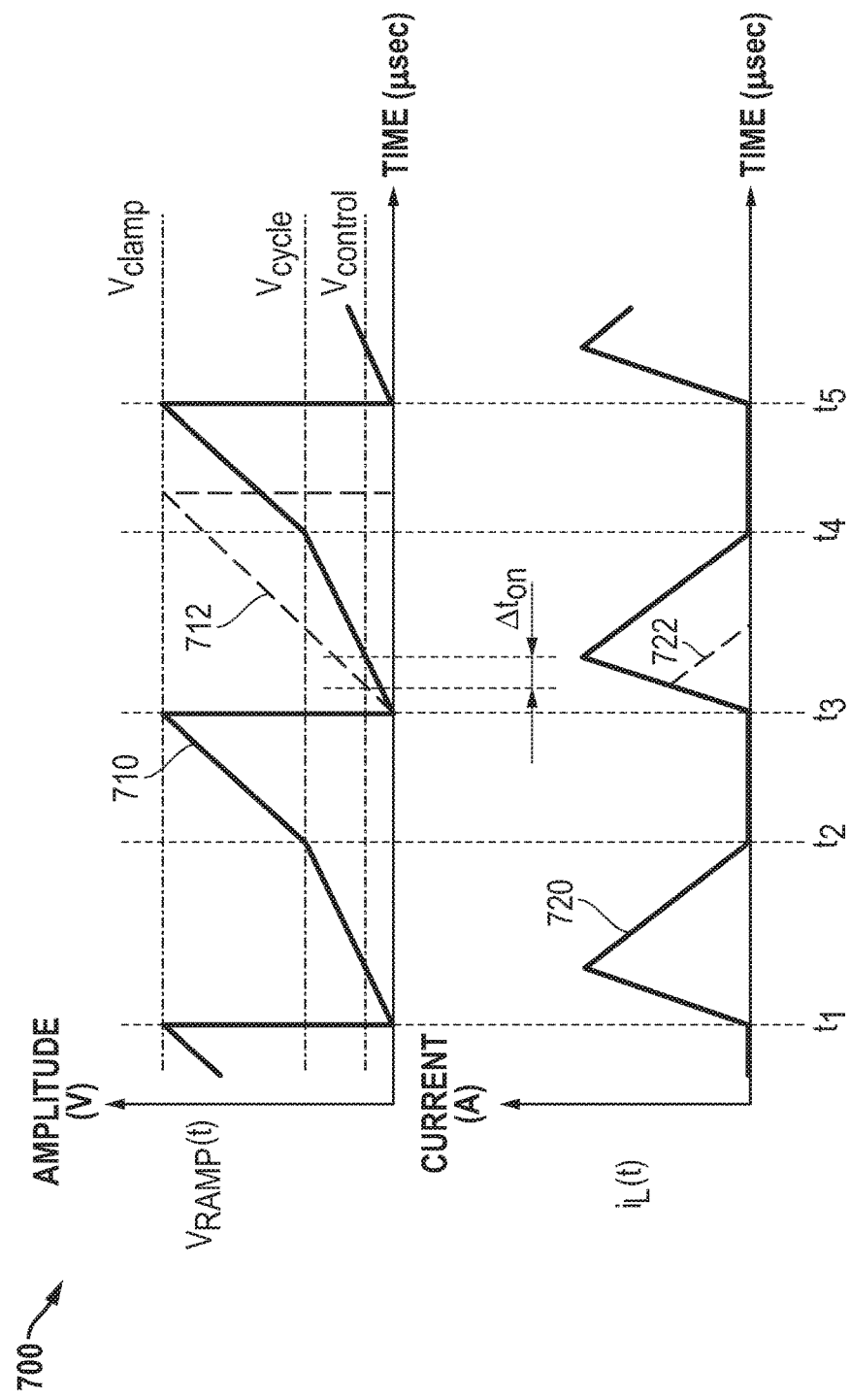
FIG. 7 illustrates a timing diagram showing the ramp voltage and the primary current generated by the PFC of FIG. 6 when operating in DCM.

FIG. 7 illustrates a timing diagram 700 showing the ramp voltage and the primary current generated by PFC controller 600 of FIG. 6 when operating in DCM. In FIG. 7, the horizontal axes represent time in μsec, and the vertical axes represent different quantities. A top portion of timing diagram 700 shows a waveform 710 of a ramp signal $v_{RAMP}(t)$ and the vertical axis represents amplitude in V. A bottom portion of timing diagram 700 shows a waveform 720 of a current signal $i_L(t)$ and the vertical axis represents amplitude in A. Timing diagram 700 shows five times of interest including times $t_1$-$t_5$.

Timing diagram 700 shows two consecutive switching cycles. At time $t_1$, a first switching cycle begins. Ramp generator 652 is reset and $v_{RAMP}(t)$ is initially 0 volts. $v_{RAMP}(t)$ increases at a first slope. $i_L(t)$ increases until $v_{RAMP}(t)$ equals $V_{CONTROL}$, at which point the on-time ends and the demagnetization phase begins. The demagnetization phase continues until $v_{RAMP}(t)$ reaches $V_{CYCLE}$ and $i_L(t)=0$ at time $t_2$. The time period between $t_1$ and $t_2$ defines the cycle time $t_{CYCLE}$. After $t_2$, PFC controller 600 operates in a dead-time period. In the dead-time period, $v_{RAMP}(t)$ continues to increase but its slope is higher. Thus ramp generator 652 generates $v_{RAMP}(t)$ as a two-slope ramp and compensates the slope for the dead-time. $i_L(t)$ remains at 0 during the dead time. Eventually $v_{RAMP}(t)=V_{CLAMP}$, which ends the current switching cycle and starts a second switching cycle. At time $t_3$, the second switching cycle begins. Waveform 720 exhibits the same on-time, demagnetization time, cycle time, and dead time during the second cycle.

The slope of waveform 710 during $t_{CYCLE}$ in DCM depends on the sensed dead-time. However the slope of waveform 710 during dead time is not affected by the modulation provided by the circuit compensating for dead-times. Thus, since $V_{CLAMP}$ does not change and since it will be seen that $V_{CYCLE}$ is not affected by the ramp slope, $t_{DT}$ is not changed by the modulation provided by the circuit compensating for dead-times.

At $t_3$, ramp generator 652 is again reset and $v_{RAMP}(t)$ is also reset 0 volts. $v_{RAMP}(t)$ and $i_L(t)$ increase until $v_{RAMP}(t)$ equals $V_{CONTROL}$, at which point the on-time ends and the demagnetization phase begins. The demagnetization phase continues until $v_{RAMP}(t)$ reaches $V_{CYCLE}$ and $i_L(t)=0$ at time $t_4$. The time period between $t_3$ and $t_4$ defines the cycle time $t_{CYCLE}$. After $t_4$, the converter operates in a dead time period. In the dead-time period, $v_{RAMP}(t)$ continues to increase but its slope increases to the same slope as in the first switching cycle. $i_L(t)$ remains at 0. Eventually $v_{RAMP}(t)=V_{CLAMP}$, at time $t_5$ which ends the new switching cycle and starts a third switching cycle.

If the load increased such that $V_{cycle}$ exceeded $V_{clamp}$ and hence the PFC controller 600 operated in CrM, $v_{RAMP}(t)$ would have the shape shown by a first phantom waveform 712 with a single, increased slope. Phantom waveform 712 shows the on-time which would be obtained when $v_{RAMP}(t)$ crosses $V_{CONTROL}$ if the ramp slope was not reduced until $v_{RAMP}(t)$ reaches $V_{cycle}$, which highlights the change in the on-time labeled "$\Delta t_{ON}$". A second phantom waveform 722 shows $i_L(t)$ which would result from the shorter on-time if the ramp slope was not reduced until $v_{RAMP}(t)$ reaches $V_{cycle}$.

According to the disclosed embodiments, however, the charging current which determines the slope of $v_{RAMP}(t)$ during the cycle time is scaled according to the dead time, that is the proportion of dead-time as a percentage of the switching period. The on-time depends on the ramp current as follows:

$$t_{ON} = \frac{C_{RAMP} * V_{CONTROL}}{I_{RAMP}} \quad [1]$$

in which $t_{ON}$ is the on-time of transistor 130, $C_{RAMP}$ is the capacitance of a ramp capacitor, $V_{CONTROL}$ is the control voltage that is based on the FB signal, and $I_{RAMP}$ is the ramp current that is driven onto the terminal of the ramp capacitor. The off-time is linked to the on-time as follows:

$$t_{OFF} = t_{ON} * \frac{V_{IN}(t)}{V_{OUT} - V_{IN}(t)} \quad [2]$$

Thus the cycle duration is:

$$t_{CYCLE} = t_{ON} + t_{OFF} = \quad [3]$$
$$t_{ON} * \frac{V_{OUT}}{V_{OUT} - V_{IN}(t)} = \frac{C_{RAMP} * V_{CONTROL}}{I_{RAMP}} * \frac{V_{OUT}}{V_{OUT} - V_{IN}(t)}$$

The ramp voltage $V_{CYCLE}$ when the current cycle ends is:

$$V_{CYCLE} = \frac{I_{RAMP}}{C_{RAMP}} = t_{CYCLE} = \frac{I_{RAMP}}{C_{RAMP}} * \frac{C_{RAMP} * V_{CONTROL}}{I_{RAMP}} * \frac{V_{OUT}}{V_{OUT} - V_{IN}(t)} = \quad [4]$$
$$V_{CONTROL} * \frac{V_{OUT}}{V_{OUT} - V_{IN}(t)}$$

Hence, the dead-time is:

$$t_{DT} = \frac{I_{RAMP0}}{C_{RAMP}} * (V_{RAMP,PK} - V_{CYCLE}) = \quad [5]$$
$$\frac{I_{RAMP0}}{C_{RAMP}} * \left(V_{RAMP,PK} - V_{CONTROL} * \frac{V_{OUT}}{V_{OUT} - V_{IN}(t)}\right)$$

in which $V_{RAMP,PK}$ is $V_{CLAMP}$ of FIG. 7. Thus according to equation [5], the dead time is constant at fixed input and output voltages.

Figure 8:
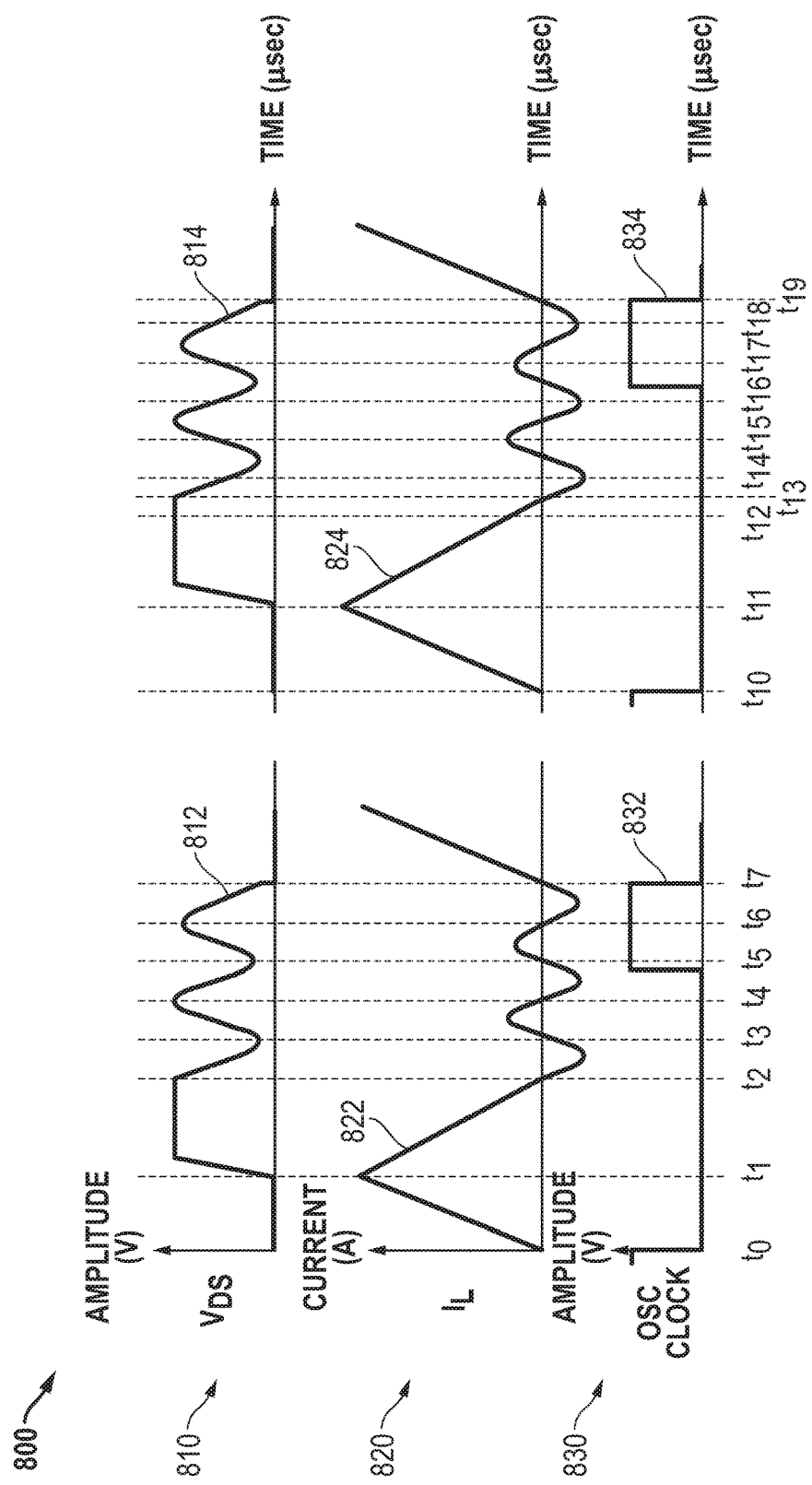
FIG. 8 illustrates a timing diagram showing three signal waveforms related to the switching of the PFC of FIG. 6.

FIG. 8 illustrates a timing diagram 800 showing three signal waveforms related to the switching of PFC controller 600 of FIG. 6. In FIG. 8, the horizontal axis represents time in µs. Three waveforms are shown on the same time axis but with different vertical axes, including a waveform 810 showing the $V_{DS}$ of transistor 130 in which the vertical axis represents amplitude in V, a waveform 820 of current $I_L$ through the primary winding of transformer 120 in which the vertical axis represents current in A, and a waveform 830 showing the OSC CLOCK signal in which the vertical axis represents amplitude in V.

Timing diagram 800 shows the operation of a PFC controller according to an embodiment that uses valley synchronized frequency foldback. Timing diagram 800 shows two switching cycles. The first switching cycle corresponds to a $V_{DS}$ waveform segment 812, an $I_L$ waveform segment 822, and an OSC CLOCK waveform segment 832. As shown in timing diagram 800, at about time $t_0$, the OSC CLOCK waveform segment transitions to a logic low. The transition sets latch 670, which activates the DRV signal. Transistor 130 becomes conductive, and its $V_{DS}$ decreases to about 0 V. The de-activation of the OSC CLOCK signal initiates a cycle of a ramp signal and load current $I_L$ rises from $t_0$ to $t_1$. At time $t_1$, the ramp signal intersects $V_{CONTROL}$, which resets latch 670 and causes driver 680 to deactivate the DRV signal. Thus $V_{DS}$ initially rises after $t_1$ until the boost diode turns on. Load current $I_L$ falls from $t_1$ to $t_2$ and transformer 120 becomes fully demagnetized at time $t_2$ and the dead-time of this switching cycle begins. $V_{DS}$ and $I_L$ start ringing, with a valley in the $V_{DS}$ waveform occurring at times $t_3$, $t_5$, and $t_7$. According to the level of $V_{FB}$, PFC controller 600 detects the third valley and de-activates the OSC CLOCK signal at time $t_7$, starting another switching cycle.

The second switching cycle corresponds to a $V_{DS}$ waveform segment 814, an $I_L$ waveform segment 824, and an OSC CLOCK waveform segment 834. In the second switching cycle, the load is smaller. As shown in timing diagram 400, the OSC CLOCK waveform segment transitions to a logic low at about time $t_{10}$. The transition sets latch 670, which activates the DRV signal. Transistor 130 becomes conductive, and its $V_{DS}$ decreases to about 0 V. The de-activation of the OSC CLOCK signal initiates a cycle of a ramp signal that rises in voltage from times $t_{10}$ to $t_{13}$, passing time $t_{11}$ that corresponds to the level of $V_{CONTOL}$ during the first switching cycle. At time $t_{11}$, the ramp signal intersects $V_{CONTOL}$, which resets latch 670 and causes driver 680 to deactivate the DRV signal. $V_{DS}$ initially rises after $t_{11}$. When transformer 120 becomes fully demagnetized at time $t_{13}$, $I_L=0$ A and the dead-time of this switching cycle begins. Note that the time from $t_{12}$ to $t_{13}$ corresponds to the additional length of the demagnetization time compared to the first switching cycle due to the lightening of the load. At time $t_{13}$, $V_{DS}$ and $I_L$ start ringing, with three valleys again occurring in the $V_{DS}$ waveform. According to the level of $V_{FB}$, PFC controller 600 again detects the third valley even though the on-time was made longer due to the modulation of the circuit to compensate for dead-times. PFC controller 600 de-activates the OSC CLOCK signal at time $t_{19}$, starting another switching cycle.

Between the first and second switching cycles, the on-time, demagnetization time, and cycle time increase, but the dead-time remains constant or substantially constant and the switching stays at the third valley. The constant or substantially constant dead-time keeps the average current waveform smooth, avoiding the current glitches with known control methods.

Figure 9:
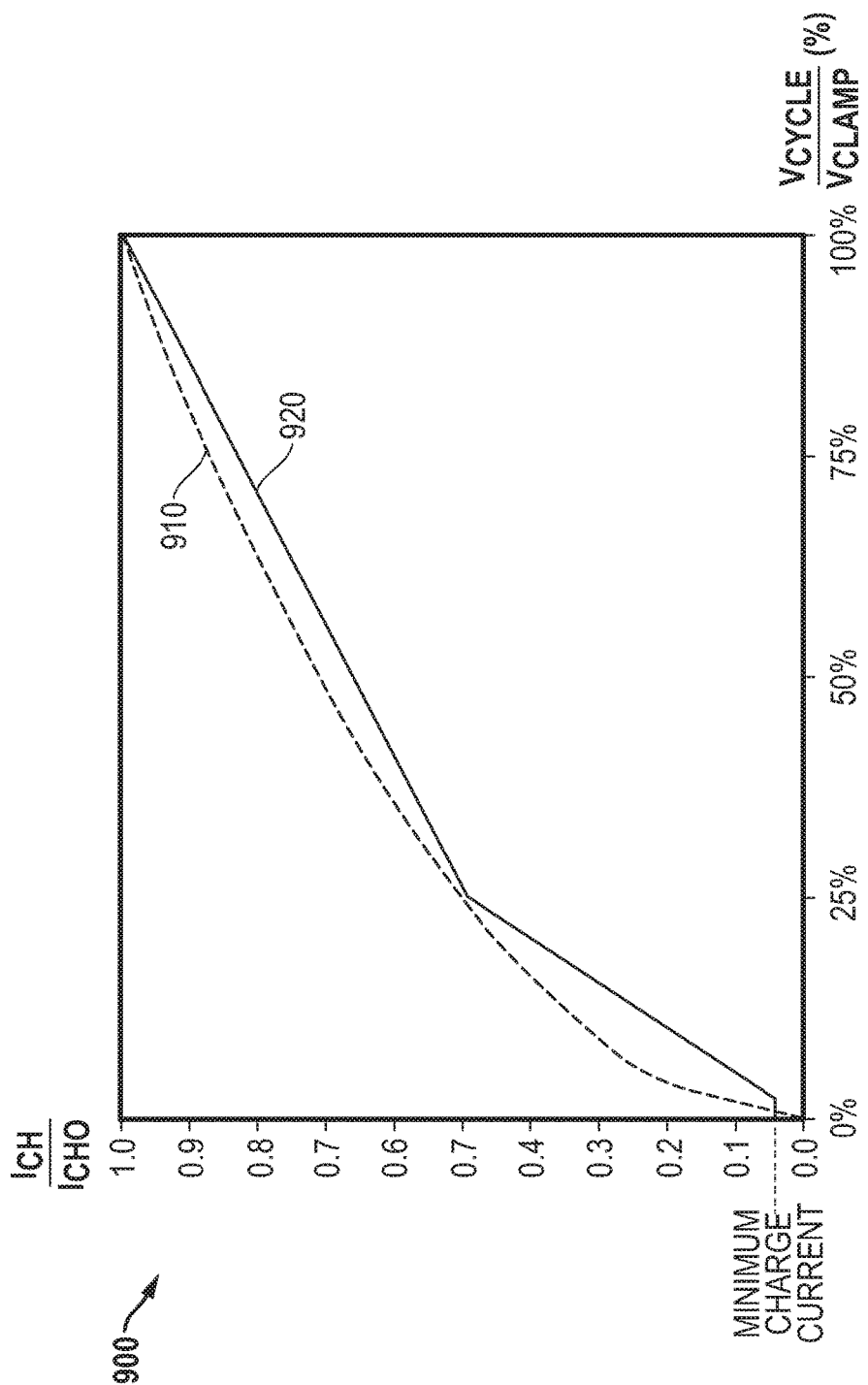
FIG. 9 illustrates a graph showing charge current modulation according to a first embodiment of the ramp generator of FIG. 6.

FIG. 9 illustrates a graph 900 showing charge current modulation according to a first embodiment of the ramp generator 652 of FIG. 6. In graph 900, the horizontal axis represents the ratio of $V_{CYCLE}$ to $V_{CLAMP}$ in percent (%), and the vertical axis represents charge current $I_{CH}$ normalized with respect to the nominal charge current at full load $I_{CH0}$. A first waveform 910 represents an ideal theoretical characteristic defined by the following equation:

$$I_{CH} = I_{CH0}\sqrt{\frac{T_{CYCLE}}{T_{CLAMP}}} = I_{CH0}\sqrt{\frac{V_{CYCLE}}{V_{CLAMP}}} \quad [6]$$

To approximate waveform 910, a second waveform 920 can be used and can be practically implemented. Waveform 920 is a 2-segment, piecewise linear approximation of waveform 910.

In this case, as $V_{CYCLE}/V_{CLAMP}$ approaches 0%, ramp generator 652 maintains a small or "minimum" charge current of about $0.04*I_{CH0}$. As $V_{CYCLE}/V_{CLAMP}$ varies from slightly above 0% to about 25%, $I_{CH}$ varies from the minimum charge current to about $0.5*I_{CH0}$. As $V_{CYCLE}/V_{CLAMP}$ increases from about 25% to 100%, $I_{CH}$ varies from about $0.5*I_{CH0}$ to $I_{CH0}$. As can be seen in FIG. 9, by using waveform 920 the error is small across the entire load range. However if greater accuracy is desired, the number of segments can be increased.

Figure 10:
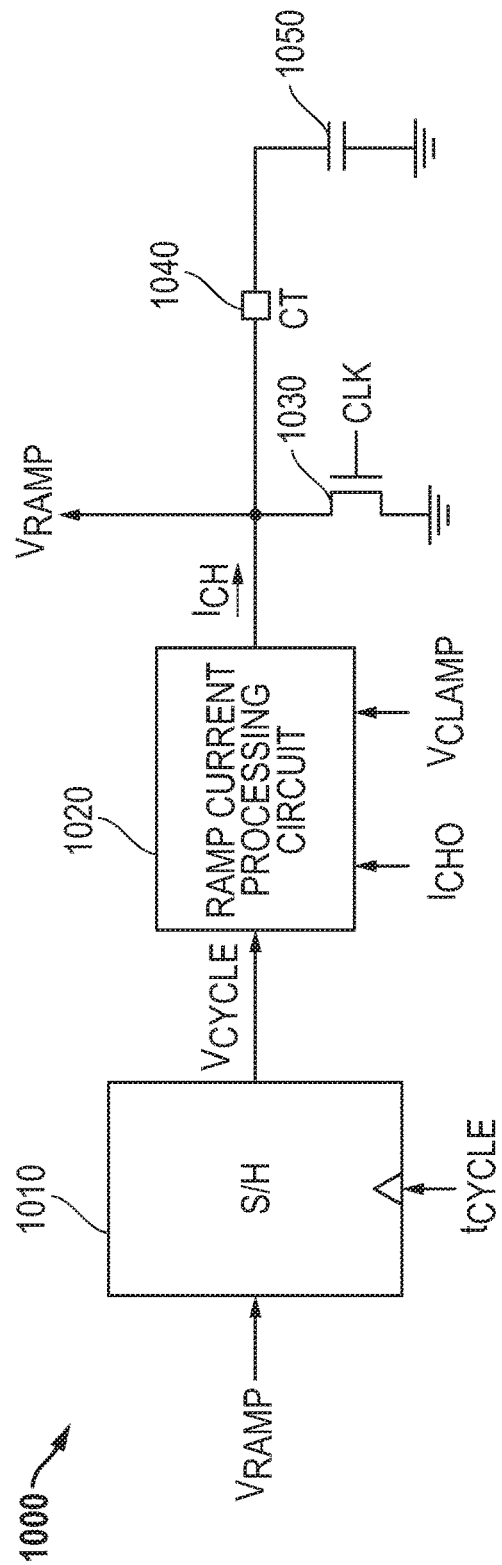
FIG. 10 illustrates in partial block diagram and partial schematic form a ramp generator circuit that can be used as the ramp generator of FIG. 6 according to the first embodiment.

FIG. 10 illustrates in partial block diagram and partial schematic form a ramp generator circuit 1000 that can be used as ramp generator 652 of FIG. 6 according to the first embodiment. Ramp generator circuit 1000 includes a sample and hold circuit 1010 labeled "S/H", a ramp current processing circuit 1020, a transistor 1030, a timing capacitor terminal 1040, and a timing capacitor 1050. Sample and hold circuit 1010 has a signal input for receiving $V_{RAMP}$, a clock input for receiving $t_{CYCLE}$, and an output for providing voltage $V_{CYCLE}$. Ramp current processing circuit 1020 has a first input connected to the output of sample and hold circuit 1010 for receiving $V_{CYCLE}$, a second input for receiving $I_{CH0}$, a third input for receiving $V_{CLAMP}$, and an output for providing current $I_{CH}$. Transistor 1030 is an N-channel MOS transistor having a drain connected to the output terminal of ramp current processing circuit 1020, a gate for receiving the CLK signal, and a source connected to ground. Timing capacitor terminal 1040 is connected to the output of ramp current processing circuit 1020 and to the drain of transistor 1030. Capacitor 1050 has a first terminal connected to timing capacitor terminal 1040, and a second terminal connected to ground.

In operation, sample and hold circuit 1010 captures the value of $V_{RAMP}$ when the current cycle ends to form $V_{CYCLE}$. Ramp processing circuit 1020 then forms charge current $I_{CH}$ for the next cycle according to $V_{CYCLE}$. For example as shown in FIG. 9, the value of $I_{CH}$ can be set according to the two-segment piecewise linear approximation of equation [6]. Alternatively, the approximation of $$\sqrt{\frac{V_{CYCLE}}{V_{CLAMP}}}$$

can be formed with more than two segments to achieve a better approximation. $I_{CH0}$ and $V_{CLAMP}$ are constants. The second input to ramp current processing circuit 1020 could either be an actual current, or a voltage that represents the level of $I_{CH0}$.

The inventors have discovered that using the relationship shown in FIG. 9 and the circuit of FIG. 10 provides a firm frequency clamp and the current waveform does not exhibit significant current glitches like current glitches 550 and 560 of FIG. 5 when transitioning between CrM and DCM.

Figure 11:
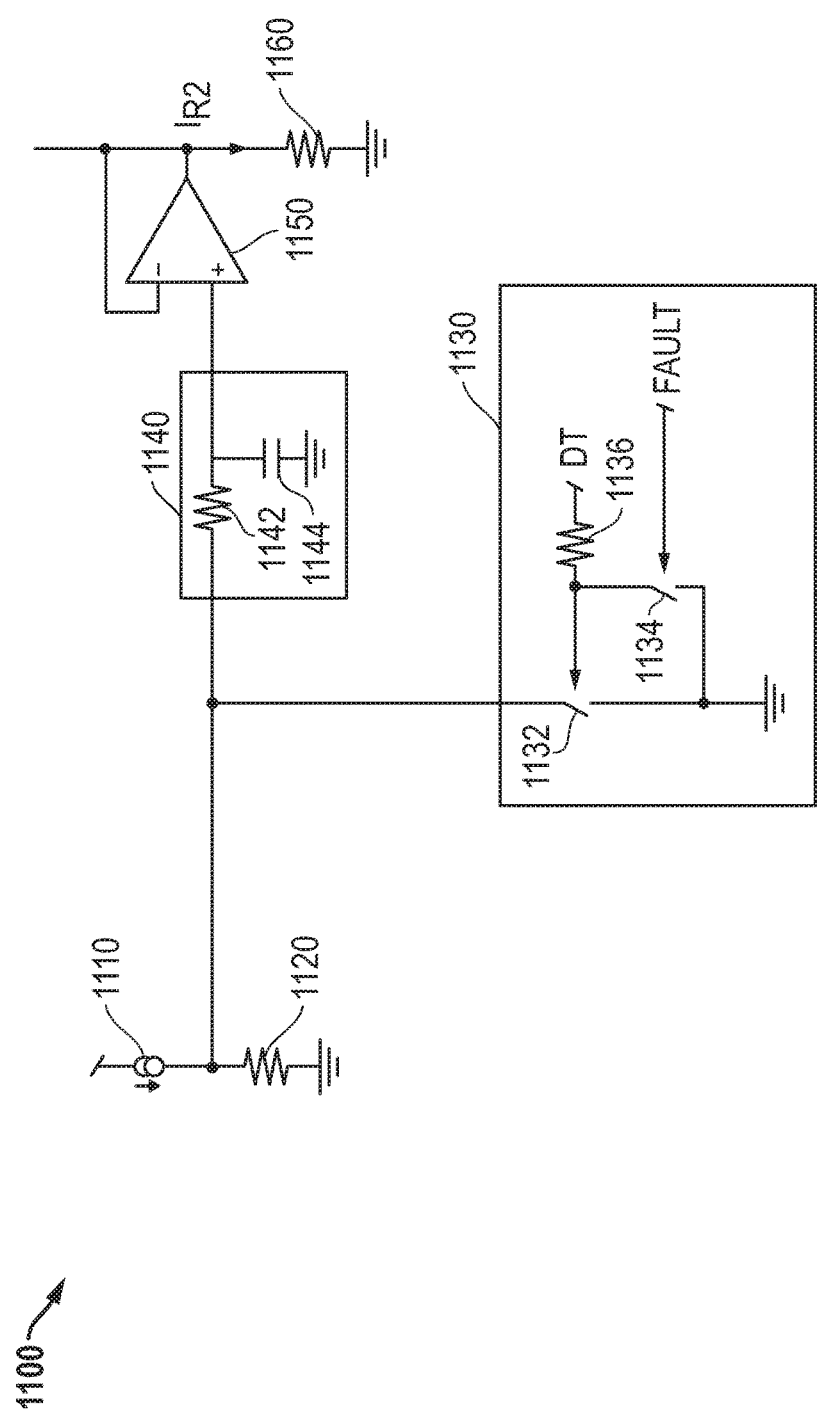
FIG. 11 illustrates in partial block diagram and partial schematic form a ramp current generator circuit that can be used in the ramp generator of FIG. 6 according to a second embodiment.

FIG. 11 illustrates in partial block diagram and partial schematic form a ramp current generator 1100 circuit that can be used in ramp generator 652 of FIG. 6 according to a second embodiment. Ramp generator 1100 includes generally a current source 1110, a resistor 1120, a dead-time modulator 1130, a resistor-capacitor (RC) filter 1140, an amplifier 1150, and a resistor 1160. Current source 1110 has a first terminal connected to $V_{CC}$, and a second terminal, and conducts a current labeled "$I_{RAMP0}$". Resistor 1120 has a first terminal connected to the second terminal of current source 1110, and a second terminal connected to ground.

Dead-time modulator 1130 includes a switch 1132, a switch 1134, and a resistor 1136. Switch 1132 has a first terminal connected to the second terminal of current source 1110 and the first terminal of resistor 1120, a second terminal connected to ground, and a control terminal. Switch 1134 has a first terminal connected to the control terminal of switch 1132, a second terminal connected to ground, and a control terminal for receiving a signal labeled "FAULT". Resistor 1136 has a first terminal connected to the control terminal of switch 1132 and the first terminal of switch 1134, and a second terminal for receiving the DT signal.

RC filter 1140 includes a resistor 1142 and a capacitor 1144. Resistor 1142 has a first terminal connected to the second terminal of current source 1110 and the first terminal of resistor 1120, and the first terminal of switch 1132, and a second terminal. Capacitor 1144 has a first terminal connected to the second terminal of resistor 1142, and a second terminal connected to ground.

Amplifier 1150 has a non-inverting input connected to the second terminal of resistor 1142 and the first terminal of capacitor 1144, an inverting input, and an output connected to the inverting input thereof. Resistor 1160 has a first terminal connected to the output of amplifier 1150, and a second terminal connected to ground, and conducts a current labeled "$I_{R2}$". If ramp generator uses a capacitor to generate $V_{RAMP}$ like capacitor 1050 of FIG. 10, it would further include a current mirror to mirror IR2 or a multiple or fraction of $I_{R2}$ into the first terminal of the capacitor, but these elements are not shown in FIG. 11 for ease of discussion.

In operation, current source 1110 generates $I_{RAMP0}$ as a current that is equal to or proportional to $I_{CH0}$. Assuming there is no fault (FAULT=0), the voltage at the input of RC filter 1140 is $I_{RAMP0}*R_{1120}$ when DT is low, and 0 otherwise, in which $R_{1120}$ is the resistance of resistor 1120. RC filter 1140 operates as a lowpass filter that forms the time average of these two values and provides the time average to the non-inverting input of amplifier 1150. Amplifier 1150 is configured as a voltage follower and thus provides the same time average on its output. Thus if resistor 1160 and resistor 1120 have the same value, $I_{R2}$ is the current through resistor 1160 that makes the voltage on the first terminal of resistor 1160 equal to $I_{RAMP0}$ modulated by the duty cycle.

Mathematically, the voltage at the non-inverting input of amplifier 1150 is equal to:

$$R_{1120} * I_{RAMP0} * \frac{T_{SW} - t_{DT}}{T_{SW}} = R_{1120} * I_{RAMP0} * d_{CYCLE} \quad [7]$$

in which $T_{SW}$ is the switching period, $t_{DT}$ is the dead-time, and $d_{CYCLE}$ is the duty cycle (where $d_{CYCLE}$ is the relative current cycle duration $t_{ON}+t_{DEMAG}$ or $t_{CYCLE}$ over the switching period $T_{SW}$ and $d_{CYCLE}=t_{CYCLE}/T_{SW}$).

Current $I_{R2}$ is the modulated ramp current and can be expressed as:

$$I_{R2} = \frac{R_{1120} * I_{RAMP0} * \frac{T_{SW} - t_{DT}}{T_{SW}}}{R_{1160}} = I_{RAMP0} * \frac{t_{CYCLE}}{T_{SW}} \quad [8]$$

if $R_{1120} = R_{1160}$.

Thus ramp current generator 1100 generates a ramp current modulated by the duty cycle using a ramp current generator circuit that is compact and easy to implement. It can be used by PFC controller 600 to continue to provide high efficiency during light load conditions by preventing the frequency from exceeding a preset level, compensating for the dead-times without substantially changing their duration, and without exhibiting significant current glitches.

Thus various embodiments of a PFC controller and an offline converter implementing PFC have been described. The PFC controller, such as PFC controller 600 of FIG. 6, can be used in an offline controller with PFC like offline power converter 100 of FIG. 1. Instead of varying dead-time to clamp or reduce the switching frequency during light-load conditions, the PFC controller uses a two-slope ramp which offers a firm frequency clamp. The slope of the first portion of the ramp is modulated to compensate for the dead-times resulting from the input voltage, output voltage, and control voltage conditions. The slope of the second portion that occurs during the dead-time is constant or substantially constant. The compensation for the dead-times thus results in no substantial variation of the dead-time. In one particular embodiment, a ramp current processing circuit determines the ramp current to define the first portion of the slope based on full load current and the value of the ramp signal at the end of the previous current cycle time. In another particular embodiment, the ramp current is modulated based on dead-time during the cycle time.

The above-disclosed subject matter is to be considered illustrative, and not restrictive, and the appended claims are intended to cover all such modifications, enhancements, and other embodiments that fall within the true scope of the claims. For example, different techniques of compensating for the dead-times without changing substantially changing the dead-time duration during DCM are possible. In one technique, a ramp current that determines both the on-time and the cycle time of the power factor correction transistor is modulated based on the full-load current, the cycle time, and the clamp voltage. The modulation can performed by a two-segment approximation of a piecewise approximation of an ideal waveform, but in other embodiments more segments can be used to achieve an approximation closer to the ideal characteristic. In another embodiment, a dead-time signal directly modulates the ramp current during the cycle time. The light-light load control technique can be combined with other circuits in a single integrated circuit. For example, the integrated circuit can include any of a variety of well-known protection features. It can also be combined with a primary side flyback controller to achieve high integration and low cost offline converter.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A power factor correction (PFC) controller, comprising:
   a regulation circuit for providing a control voltage in response to a feedback voltage received at a feedback input terminal, wherein said feedback voltage is proportional to an output voltage;
   a dead-time detection circuit having an input coupled to a zero current detection input terminal, and an output for providing a dead-time signal; and
   a pulse width modulator responsive to said control voltage and said dead-time signal to provide a drive signal that controls conduction of a switch to improve a power factor of an offline converter, wherein said pulse width modulator modulates both an on-time and a switching period of said drive signal using said dead-time signal in a discontinuous conduction mode without substantially changing dead time.

2. The PFC controller of claim 1, wherein said pulse width modulator modulates both an on-time of said switch and a switching period of said switch according to a dead-time using a ramp signal.

3. The PFC controller of claim 2, wherein said pulse width modulator comprises:
   a ramp generator having a first input for receiving a dead-time signal, a second input for receiving a clock signal, and an output for providing said ramp signal, wherein said ramp generator modulates a slope of said ramp signal in response to said dead-time signal; and
   a clock generation circuit having a first input for receiving said ramp signal, a second input for receiving a clamp voltage, and an output for providing said clock signal.

4. The PFC controller of claim 3, wherein said ramp generator provides said ramp signal at a first slope when said dead-time signal is inactive and at a second slope greater than said first slope when said dead-time signal is active, and resets said ramp signal in response to said clock signal.

5. The PFC controller of claim 3, wherein:
   said pulse width modulator further comprises a valley detection circuit having an input for receiving a zero current detection signal, and an output for providing a valley signal to indicate when a drain-to-source voltage of said switch is in a valley; and
   said clock generation circuit further has a third input for receiving said valley signal and activates said clock signal when said ramp signal equals said clamp voltage and said valley signal is active.

6. The PFC controller of claim 3, wherein:
   said pulse width modulator further increases said on-time as a function of the relative duration of said dead-time over a cycle time of said clock signal.

7. The power factor correction (PFC) controller of claim 1, wherein said pulse width modulator comprises:
   a ramp control circuit having an input for receiving said dead-time signal, a first output for providing a ramp signal, and a second output for providing a clock signal, wherein said ramp control circuit modulates a slope of said ramp signal in response to said dead-time signal;
   a comparator having a negative input for receiving said control voltage, a positive input for receiving said ramp signal, and an output; and
   a latch having an output that is set in response to said clock signal and is reset in response to said output of said comparator; and
   a driver having an input coupled to said output of said latch, and an output coupled to a drive terminal for providing a drive signal to a control electrode of said switch.

8. The PFC controller of claim 7, wherein said ramp control circuit comprises:
   a ramp generator having a first input for receiving said dead-time signal, a second input for receiving said clock signal, and an output for providing said ramp signal, wherein said ramp generator modulates a slope of said ramp signal in response to said dead-time signal; and
   a clock generation circuit having a first input for receiving said ramp signal, a second input for receiving a clamp voltage, and an output for providing said clock signal.

9. The PFC controller of claim 8, wherein said ramp generator provides said ramp signal at a first slope when said dead-time signal is inactive and at a second slope greater than said first slope when said dead-time signal is active, and resets said ramp signal in response to said clock signal.

10. The PFC controller of claim 8, wherein:
    the PFC controller further comprises a valley detection circuit having an input for receiving a zero current detection signal, and an output for providing a valley signal to indicate when a drain-to-source voltage of a power factor correction transistor is in a valley; and
    said clock generation circuit further has a third input for receiving said valley signal and activates said clock signal when said ramp signal equals said clamp voltage and said valley signal is active.

11. The PFC controller of claim 8, wherein:
    said ramp generator reduces a slope of said ramp signal according to a percentage of time said dead-time signal is inactive to a cycle time of said clock signal.

12. An offline converter, comprising:
    a rectifier for converting a sinusoidal input voltage into a rectified input voltage;
    an inductive element having a first terminal for receiving said rectified input voltage, and a second terminal;
    a diode having a first terminal coupled to said second terminal of said inductive element, and a second terminal for providing a bulk voltage for a load;

a bulk capacitor having a first terminal coupled to said second terminal of said diode, and a second terminal coupled to ground;

a switch having a first current electrode coupled to said second terminal of said inductive element, a control terminal, and a second current electrode; and a PFC controller coupled to said inductive element, said second terminal of said diode, and said control terminal of said switch, wherein said PFC controller modulates a conduction of said switch to make a current through said inductive element in phase with said rectified input voltage, wherein in a discontinuous conduction mode said PFC controller modulates both an on-time of said switch and a switching period of said switch according to a dead-time.

13. The offline converter of claim 12, wherein said PFC controller modulates both an on-time of said switch and a switching period of said switch according to a dead-time using a ramp signal.

14. The offline converter of claim 13, wherein said PFC controller comprises:
a ramp generator having a first input for receiving a dead-time signal, a second input for receiving a clock signal, and an output for providing said ramp signal, wherein said ramp generator modulates a slope of said ramp signal in response to said dead-time signal; and
a clock generation circuit having a first input for receiving said ramp signal, a second input for receiving a clamp voltage, and an output for providing said clock signal.

15. The offline converter of claim 14, wherein said ramp generator provides said ramp signal at a first slope when said dead-time signal is inactive and at a second slope greater than said first slope when said dead-time signal is active, and resets said ramp signal in response to said clock signal.

16. The offline converter of claim 15, wherein:
said PFC controller further comprises a valley detection circuit having an input for receiving a zero current detection signal, and an output for providing a valley signal to indicate when a drain-to-source voltage of a power factor correction transistor is in a valley; and
said clock generation circuit further has a third input for receiving said valley signal and activates said clock signal when said ramp signal equals said clamp voltage and said valley signal is active.

17. The offline converter of claim 14, wherein:
said PFC controller further increases said on-time as a function of the relative duration of said dead-time over a cycle time of said clock signal.

18. A method for line current shaping to increase a power factor of an offline converter comprising:
rectifying a sinusoidal input voltage into a rectified input voltage;
conducting a current generated from said rectified input voltage from a first terminal to a second terminal of an inductive element;
rectifying a voltage at said second terminal of said inductive element to form a bulk voltage;
filtering said bulk voltage using a bulk capacitor; and
selectively switching a current at said second terminal of said inductive element to ground using a switch, wherein said selectively switching comprises generating a ramp signal and modulating both an on-time and a switching period of said switch according to a dead-time in a discontinuous conduction mode.

19. The method of claim 18, wherein said modulating comprises:
modulating both said on-time and said switching period of said switch by generating a ramp signal in response to said dead-time in said discontinuous conduction mode.

20. The method of claim 19, wherein said generating said ramp signal comprises:
generating said ramp signal at a first slope during a first portion of a switching cycle; and
generating said ramp signal at a second slope greater than said first slope during a second portion of said switching cycle.

21. The method of claim 20, wherein said generating said ramp signal further comprises:
determining a cycle voltage as a value of said ramp signal at a start of a dead time during a first switching cycle; and
changing said ramp signal from said first slope to said second slope in response to said ramp signal exceeding said cycle voltage in a second switching cycle subsequent to said first switching cycle.

22. The method of claim 21, wherein said determining a value of said ramp signal at a start of a dead time during a first switching cycle comprises:
sampling and holding said value of said ramp signal at said start of said dead time during said first switching cycle.

23. The method of claim 21, further comprising:
repeating said determining a cycle voltage and said changing said ramp signal from said first slope to said second slope for a plurality of switching cycles.

24. The method of claim 20, wherein said generating said ramp signal further comprises:
generating said ramp signal at said first slope using a charge current;
determining a start of a dead-time of said switching cycle; and
increasing said charge current in response to said determining said start of said dead-time of said switching cycle.

25. The method of claim 19 wherein said generating said ramp signal comprises:
entering said discontinuous conduction mode in response to said switching period being less than a period of said ramp signal.

26. The method of claim 25 wherein simultaneously modulating both said on-time and said switching period of said switching in said discontinuous conduction mode comprises:
simultaneously modulating both said on-time and said switching period of said switching in said discontinuous conduction mode in response to a level of a load.

* * * * *